Aug. 4, 1953      B. H. LOCKE      2,647,786
BOTTLE HOLDER AND CARRIER
Filed Jan. 24, 1950

INVENTOR
Burton H. Locke

Patented Aug. 4, 1953

2,647,786

UNITED STATES PATENT OFFICE 2,647,786

BOTTLE HOLDER AND CARRIER

Burton H. Locke, Framingham, Mass.

Application January 24, 1950, Serial No. 140,307

2 Claims. (Cl. 294—87.28)

This invention relates to a device to facilitate the handling of milk bottles intermediate the delivery thereof to a home and the placing thereof into a refrigerator, or to other position in the home by the recipient.

The main object of the invention is to provide a device that is capable of being quickly suspended on or removed from the side wall of a house or on the outside of a door, or a like position, and of holding a plurality of bottles that can be easily placed therein by a milkman, and having a means whereby the same, with the bottles intact, can be lifted from its suspended position and carried into the house in one hand while leaving the other hand free to manipulate the house doors, etc.

If the holder is suspended on the outside of a door the milk would be positioned between the door and a storm door, that may be afforded on the house, and in such instances the milk would be protected from the weather, and when the door is opened the carrier will swing inwardly on the door and the milk can be retrieved by a person without the person going outside. Obviously, such a procedure is very convenient and is most desirable in the winter time.

Another use of the holder and carrier to be set forth could be made by the milkman in that he could use the same for lifting bottles of milk from the conventional milk bottle case in his truck and then carry the bottles of milk by means of the carrier to the house and suspend the carrier, with the bottles of milk intact, onto the house support. After the following specification has been examined it will be apparent that the carrier could be quickly attached to the necks of a plurality of bottles in the case simultaneously by the carrier being tipped and slid down onto the necks of the standing bottles in the case. Then the carrier can be lifted vertically which would lift the bottles of milk from the case in proper position to be carried intact in the holder to the house. This procedure would eliminate the present method which requires the bottles of milk to be lifted individually from the case and then be placed into a conventional carrier for carriage to the house and then to be removed therefrom when being deposited at the house. Therefore, it is obvious that the device to be set forth and the use thereof is susceptible of eliminating considerable individual handling of milk bottles in the process of transporting the same from a milkman's truck to the recipient's refrigerator.

Another object is to afford suspension of the bottles above the usual position of standing on a porch floor, or on a step, so as to position the same out of the path and contact of animals and to position them where they will not be booted or otherwise knocked from the porch or step by children at play, or other persons in passing, and thereby eliminate possibilities of breakage and contamination from dirt and other counterments.

Another object is to afford means whereby the device with its contents intact can be lifted from its hanging position and carried into the home with one hand without the danger of the bottles becoming inadvertently dropped from the carrier.

For the main part, the object of the invention is to afford a novel means of handling a plurality of milk bottles from the delivery thereof outside a house, or from a delivery truck as set forth, to within the house which heretofore has been more or less of a laborious task due to the necessary requirement of opening doors, etc., and to teach how the same can be facilitated.

Another object is to provide a substantial open type vertical structure that is inherently light in weight and for this reason is susceptible of easy manipulation and of being manufactured at a relatively lower cost than the construction set forth in my application filed Sept. 10, 1949, Serial No. 114,962.

Figure 1:
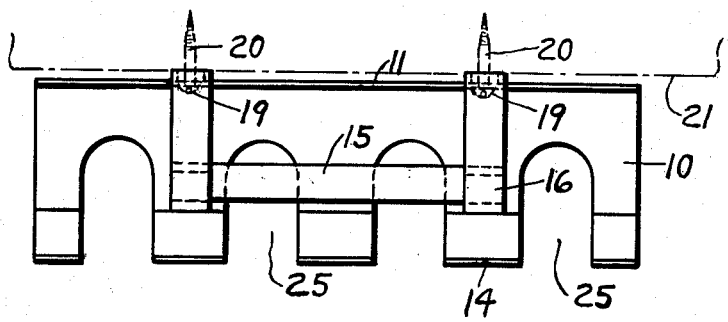
Figure 1 is a plan view of my improved milk bottle holder as it would appear suspended on a wall in position to receive the bottles.

My improved constructed bottle holder and carrier comprises a substantial rectangular-shaped base plate 10 that can be made of a relatively thicker sheet material than that used in the structure set forth in my prior application without adding excessive weight to the complete carrier for reason that the sheet is relatively narrow because it does not extend vertically to form the vertical back support as in the prior construction and, resultantly, considerable less volume of metal is involved. The base plate 10 is generally bent up a relatively small amount on the back longitudinal edge thereof to form a relatively narrow flange 11 which stiffens the plate structure and affords a portion on which to attach a plurality of relatively narrow vertical suspending members 12, either by means of welding; riveting, or bolting.

Inasmuch as the base plate 10 can be practically constructed of a material relatively thicker than that permitted in my prior construction, it is not necessary that the edges of the sheet be folded back on themselves to stiffen the sheet structure and to eliminate the thin edges of the sheet as is required in the said construction set forth in my prior application. Therefore, several operations are eliminated in the forming of the present plate structure over the sheet structure set forth in my prior application.

The relatively narrow vertical members 12 are secured in spaced relation to the back bent edge, or flange, 11 and extend upwardly, generally perpendicular to the base plate 10, to serve to support the holder against a house wall, or door, or the like. The upper portion 13, of members 12, is bent forwardly over the said base plate 10 and then downwardly and again secured to said plate nearer the front edge 14 thereof to form a rigid construction.

Figure 3:
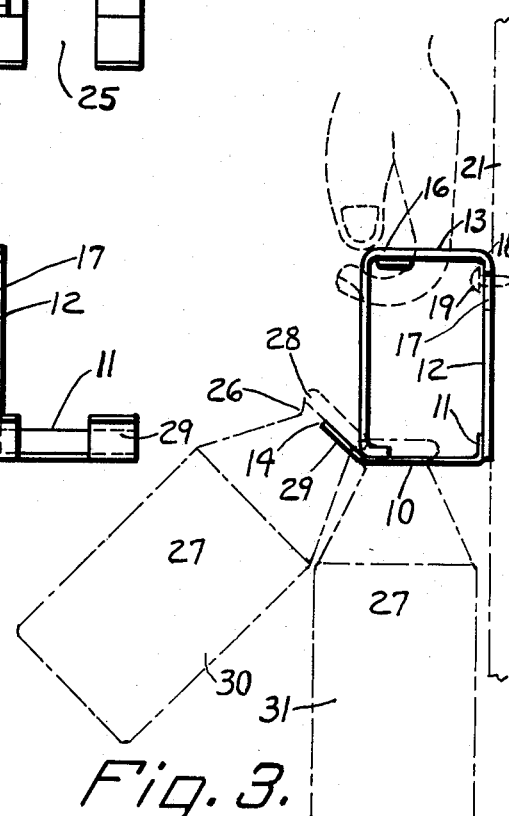
Figure 3 is an end elevation of the same and showing how the bottles are slid therein and how the device is lifted and carried.

A bar member 15, bridging the vertical members 12 and secured thereto near the upper front portion 16 thereof by welding or riveting, serves as a handle to lift and carry the holder, as shown in Figure 3. It will be noted that handle 15 is positioned at the center of gravity of the holder and its contents relative to Figure 3. Thus the holder and its contents will be in balance when being carried.

There is an aperture 17 near the upper rear edge 18, of each vertical member 12, for the purpose of receiving the heads 19 of screws, or nails, 20 that may be secured in a house wall, or door, 21 against which the holder will rest when being suspended on said screws. The apertures 17 are enlarged, as at 22, to admit the heads 19, of screws 20, and are relatively narrow at the top 23, thereof, to just receive the body portion of the screws 20 when the holder is lowered after being placed over the said heads through the medium of the large open portion 22, of the apertures 17. Obviously, the holder can be removed from the screws 20 only when the same is lifted to permit the enlarged portion 22, of the apertures, to pass over the heads of the screws.

Other means, such as hooks, or the like, could be provided on the vertical bar members for the purpose of providing a means to permit manually hanging of the holder onto a wall, or door, as desired without departing from the main features of the invention.

The front longitudinal edge portion, of base plate 10, is inclined upwardly and there are a plurality of slots 25 extending inwardly from the said edge and terminating within the said plate. Each of the slots 25 is of proper width to receive the neck portion 26 of a milk bottle 27 and to check the passing of the relatively larger rim portion 28 at the top of the bottle therethrough. The outer upwardly inclined portion 29 of base plate 10, requires the bottle 27 to be tilted substantially perpendicular to the said inclined portion, as at 30, and then slid down the inclined portion while in this tilted position in order to become hung by the rim portion thereof in a vertical position, as at 31, within the slot.

It is necessary that the bottles be tilted in the same manner and then slid up the incline when being removed from the slots 25. Therefore, it is obvious that the holder can be lifted and removed from the screws 20 and then carried where desired after the bottles have been seated in the vertical position 31 without the bottles becoming disengaged for reason that the bottles would first have to tip, as at 30, and then shift up the incline in this tipped position to become disengaged from the holder.

Inasmuch as it is practically permissible to construct the base plate 10 relatively thicker than the sheet utilized in the construction set forth in my prior application for reasons set forth, it is not necessary to loop the edge of the inclined front portion to stiffen the construction and to eliminate the thin edge of the sheet at this point as it was in the prior structure. Thus the structure set forth herein would be still further less expensive to manufacture. Also, the edges of the slots that support the bottles would be of a thicker and more substantial construction. Furthermore, the elimination of the solid vertical back plate of my prior construction affords more room for a person's hand when lifting and carrying the holder. Also, the holder carries in better balance due to the elimination of the solid overhanging back plate which tends to over balance the device backward when it is lifted by its handle due to the concentration of weight at the back plate. Still furthermore, the vertical bar members of the present construction are of a thicker material than the thin back sheet of my prior structure and therefore a more rigid contact area with the suspension screws 20 is afforded.

Therefore, it is obvious that the present construction has many advantages over the prior structure and therefore an improved device is set forth herein.

Figure 2:
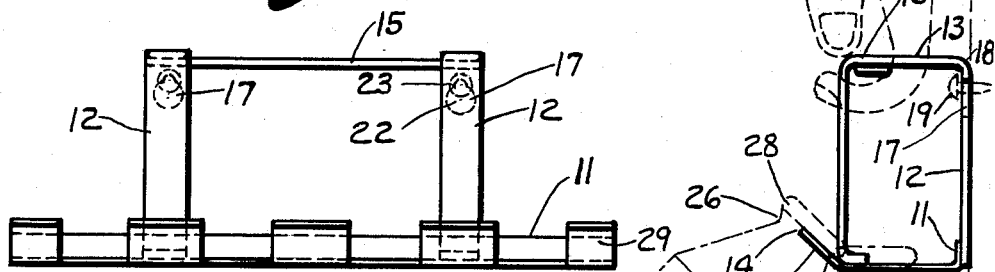
Figure 2 is a front elevation of the same.
Figure 4:
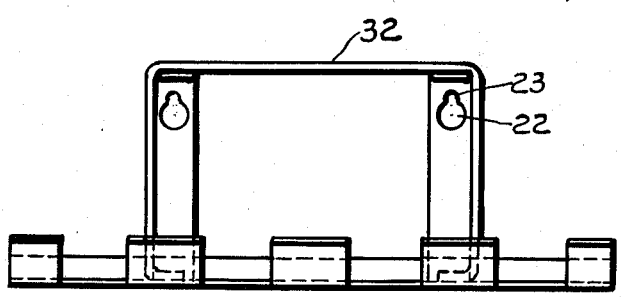
Figure 4 is a front elevation of a holder having a modified form of open vertical structure.
Figure 5:
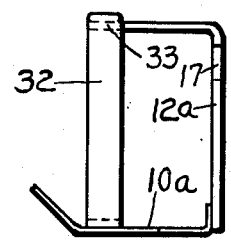
Figure 5 is an end elevation of the same.

There are other ways that the open type vertical structure of the present invention could be formed in conjunction with a properly positioned carrying handle and disposed on a base member to form a rigid light weight constructed bottle carrier. A modified form is shown by Figures 4 and 5 wherein the handle bar member 32 is bent downwardly and attached to the base plate 10a while the vertical back bar members 12a extend upwardly and forwardly to terminate by attachment with the said bar handle member 32, as at 33. It is obvious that such a construction is operatively comparable to that shown in Figures 1 to 3, inclusive.

I do not wish to be confined to the exact details as the same are susceptible of modification without departing from the spirit or scope of the invention to be set forth in the claims to follow.

I claim:

1. A bottle holder and carrier for bottles having neck portions and larger rim portions thereabove comprising a rectangular plate, one longitudinal edge of said plate being bent vertically upwardly, the other longitudinal edge of said plate being bent upwardly on an incline, a plurality of slots extending in from the inclined longitudinal edge of the plate and terminating within the plate, each said slot being suitable to admit the neck portion of a bottle and to check the rim portion of said bottle from passing therethrough, a plurality of bar members disposed vertically on said plate and attached thereto, the top portion of said members being connected together, at least two of the said bar members being positioned at the vertically bent-up edge of the plate, an aperture in the form of an inverted key-slot in each such positioned bar member near the top portion thereof, a bar handle member connected to the top portion of the vertically disposed bar members, said handle member being disposed substantially above the center of gravity of the holder with bottles suspended therein.

2. A bottle holder and carrier for bottles having neck portions and larger rim portions thereabove comprising a rectangular plate, one longitudinal edge of said plate being bent vertically upwardly, the other longitudinal edge of said plate being bent upwardly on an incline, a plurality of slots extending in from the inclined longitudinal edge of the plate and terminating within the plate, each said slot being suitable to admit the neck portion of a bottle and to check the rim portion of said bottle from passing therethrough, a plurality of bar members disposed vertically on said plate and attached thereto, the top portion of said members being connected together, at least two of the said bar members being positioned at the vertically bent-up edge of the plate, means on each such positioned bar member to suspend the device against a support, a bar handle member connected to the top portion of the vertically disposed bar members, said handle member being disposed substantially above the center of gravity of the holder with bottles suspended therein.

BURTON H. LOCKE.

References Cited in the file of this patent

UNITED STATES PATENTS

| Number | Name | Date |
|---|---|---|
| 1,054,408 | Hammes | Feb. 25, 1913 |
| 1,888,324 | Matthai | Nov. 22, 1932 |
| 2,028,694 | Spinks | Jan. 21, 1936 |
| 2,067,124 | Hoffman | Jan. 5, 1937 |
| 2,264,903 | Kruea | Dec. 2, 1941 |
| 2,276,756 | Agrillo et al. | Mar. 17, 1942 |